(12) United States Patent
Rieger

(10) Patent No.: US 8,063,733 B2
(45) Date of Patent: Nov. 22, 2011

(54) DEVICE FOR COMMUNICATING WITH A SYSTEM

(75) Inventor: Gottfried Rieger, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 989 days.

(21) Appl. No.: 10/571,499

(22) PCT Filed: Aug. 27, 2004

(86) PCT No.: PCT/EP2004/009597
§ 371 (c)(1),
(2), (4) Date: Mar. 10, 2006

(87) PCT Pub. No.: WO2005/040947
PCT Pub. Date: May 6, 2005

(65) Prior Publication Data
US 2007/0030114 A1 Feb. 8, 2007

(30) Foreign Application Priority Data
Sep. 24, 2003 (DE) .................. 103 44 361

(51) Int. Cl.
*G05B 23/02* (2006.01)

(52) U.S. Cl. .................. 340/3.1; 340/4.11; 340/5.1
(58) Field of Classification Search ................. 340/3.1, 340/5.6, 4.11, 4.42, 4.61, 5.1; 710/5
See application file for complete search history.

(56) References Cited

U.S. PATENT DOCUMENTS

| | | | |
|---|---|---|---|
| 6,192,236 B1 * | 2/2001 | Irvin | 455/420 |
| 6,378,026 B1 * | 4/2002 | Chan et al. | 710/300 |
| 6,496,927 B1 * | 12/2002 | McGrane et al. | 713/1 |
| 6,762,572 B1 * | 7/2004 | Ishii et al. | 318/139 |
| 6,927,546 B2 * | 8/2005 | Adamson et al. | 315/312 |
| 2002/0080931 A1 * | 6/2002 | Yamamoto et al. | 379/90.01 |

FOREIGN PATENT DOCUMENTS

| | | |
|---|---|---|
| DE | 38 13 590 A1 | 11/1988 |
| DE | 41 39 041 A1 | 6/1992 |
| DE | 198 30 880 A1 | 1/2000 |

* cited by examiner

Primary Examiner — Vernal Brown

(57) ABSTRACT

A device for communicating with a system, especially for operating and monitoring an automated industrial manufacturing system is described. The device contains a mobile communication device for wireless exchange of data with the system. Further, the device also includes a fixed installed connection for the communication device and a sensor recognizing whether the communication device is connected to the fixed installed connection.

10 Claims, 2 Drawing Sheets

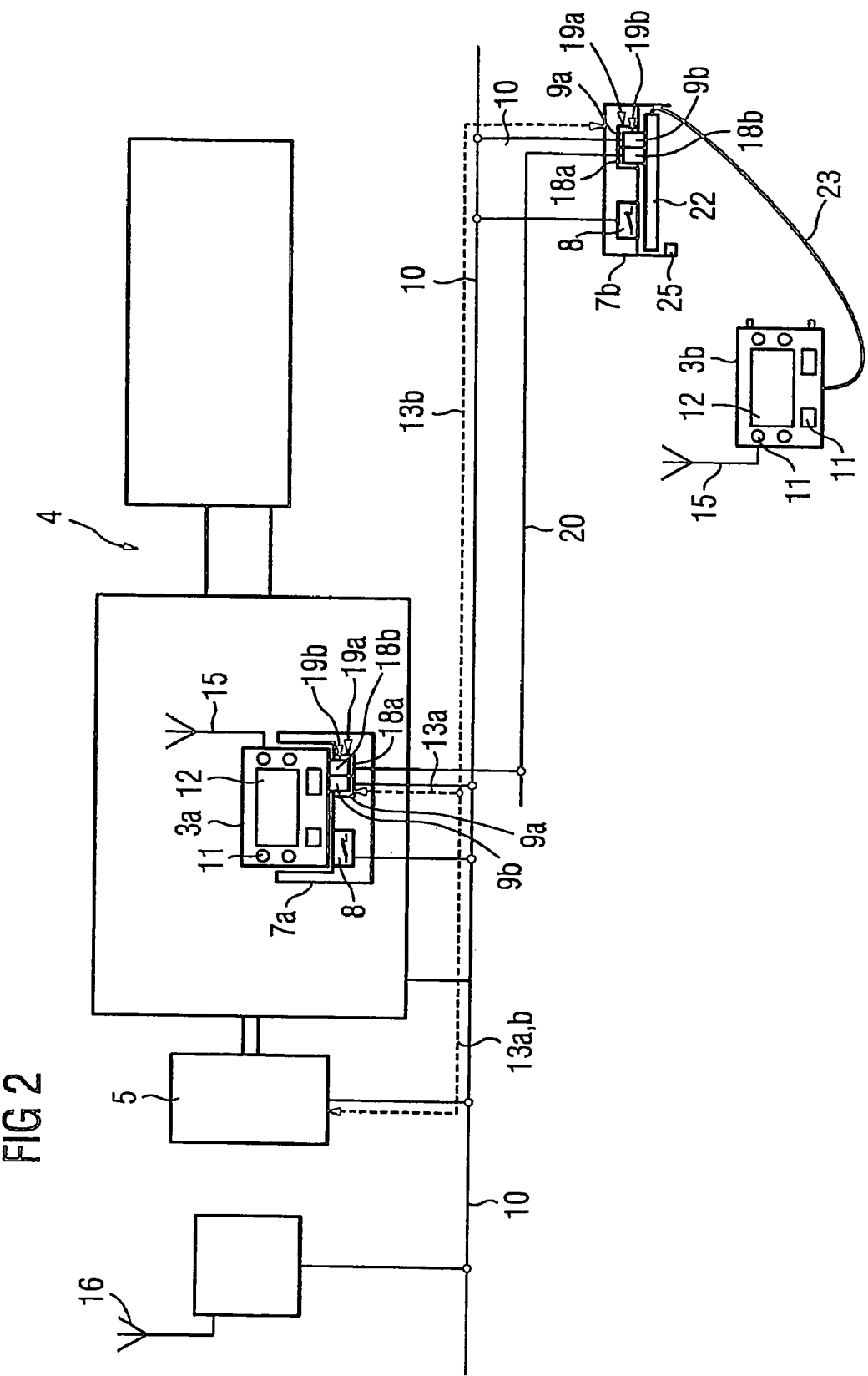

DEVICE FOR COMMUNICATING WITH A SYSTEM

CROSS REFERENCE TO RELATED APPLICATIONS

This application claims priority to the German application No. 10344361.4, filed Sep. 24, 2003, and to the International Application No. PCT/EP2004/009597, filed Aug. 27, 2004 which are incorporated by reference herein in their entirety.

FIELD OF INVENTION

The invention relates to an apparatus for communicating with a system, in particular for operating and monitoring an automation system in industrial manufacturing.

BACKGROUND OF INVENTION

Input and output devices must be connected to industrial automation systems in order to run said systems; this is known as process interfacing. Output devices (monitoring devices) include e.g. check lights, alphanumeric or graphical displays, which inform the system operator about the current system state. Input devices (operator devices) include e.g. switches, rotary knobs or keyboards for alphanumeric input, which allow the operator to act on the system.

SUMMARY OF INVENTION

In order to allow communication between user and system, so -called operator devices and monitoring devices, subsequently referred to simply as communication devices, are usually installed permanently on the system itself or e.g. in the manufacturing hall where the system is located. A typical communication device has a convenient casing in which input and output devices are arranged. The data interchange with the system or its control unit takes place via an interface cable which is permanently installed.

Provision is also made for communication devices which are connected to the system via a cable of greater or lesser length and allow mobility for the operator at or along the system within the limits of the range of the cable, wherein the operator can take the communication device with him or her.

In the case of very large or relatively inaccessible systems, cable -based communication devices are no longer practicable. Mobile communication devices, i.e. freely movable communication devices which communicate wirelessly with the system and are battery powered, exist for this purpose and handle the data interchange with the system via radio connection. So-called docking stations exist for this type of communication device, e.g. in the form of a storage receptacle, and are used for housing the communication devices and charging the batteries which are present in the devices. The storage receptacles are located e.g. near the system or in a separate area such as the supervisor cabin.

In order to set up a manufacturing process on a system, said system is first started in a running mode which is known as setup mode or learning mode. Fine tuning of the system is performed via the connected communication devices in this context, e.g. the traverse paths of robot arms are configured. Communication devices which work in a wireless manner are normally only used during the setup mode, since here the operator requires maximal mobility at the system in order to be able to monitor and thus configure subprocesses accurately.

Once the manufacturing process has been set up on the system, the system is switched into the normal mode, e.g. its production speed is increased. During the normal mode, wireless communication devices are not usually required or are even undesirable because they are battery driven and therefore have only a limited service life or because they place an unnecessary load on the radio network of the system provider. The mobile communication devices are therefore stored away or, according to DIN, must even be locked away if they include safety-related functions (stop functions or permission functions). Communication with the system during the normal mode then takes place via conventional, permanently installed communication devices, which often also have different functionality, e.g. do not provide any specific functions for setting up the system process.

Until now, therefore, different running states of the system have required different communication devices, and these must therefore be procured concurrently. All communication devices must also be serviced, managed or programmed accordingly, thereby incurring significant expenditure in terms of cost and effort.

The present invention addresses the problem of specifying an apparatus for communicating with a system, wherein said apparatus is designed to be less resource intensive and less costly.

The problem is solved by an apparatus for communicating with a system, in particular for operating and monitoring an automation system in industrial manufacturing, which apparatus features a mobile communication device for wirelessly exchanging data with the system. The apparatus also includes a connection interface for the communication device, said connection interface being installed at a fixed location, and a sensor for detecting whether the communication device is connected to the connection interface.

As a result of the mobile i.e. freely movable communication device, which includes wireless functionality, the system operator has maximal freedom of movement at the system. In setup mode, the operator can freely select an optimal location in order to check or adjust the system function as effectively as possible.

Upon completion of the setup mode, the operator can connect the communication device to the connection interface which is installed at a fixed location.

In this context, installed at a fixed location means that the connection interface has a permanent connection to the system and is assigned a defined location at the system. This can also include a service line from the system to the connection interface, said service line being slightly flexible, such that the connection interface can be positioned in a user-friendly manner.

The sensor can be a light barrier, a proximity sensor or a contact loop, for example. It detects that the communication device is connected. The system control unit is connected to the sensor and is capable of analyzing this information and also notifying the communication device. The connecting of the communication device can therefore serve as a signal, for example, in order to switch the system into the normal mode and to deactivate the setup-specific functionality at the communication device.

It is therefore possible to influence the functionality of the communication device by utilizing the sensor information. For example, specific keys can be rendered inactive when the communication device is in the connected state, if said keys are only required for the setup mode. It is also possible for a graphical display on the communication device to show other information depending on its connection state. A wide variety of possibilities are available here via the programming of the system or the control unit. The subsequent operation of the system in the normal mode or manufacturing mode takes place using the same communication device, now connected to the connection interface, as was used during the setup mode.

It is financially advantageous for the system provider that it is only necessary to invest in a single communication device, with which the system can be operated and monitored in all running modes. A further advantage of the apparatus is that a defined position is established on the system, namely the permanently installed connection interface, at which the communication device is connected during normal mode and is there fore easy to find at any time. Therefore it is not necessary to lock the communication device away, since it is also intended for the normal mode of the system.

Additionally, it might be necessary during normal manufacturing briefly to switch the system into a correction mode which is similar to the setup mode, in order to make post-adjustments to parts of the system, for example. This would previously have necessitated the reactivation of the separate communication device having wireless functionality, wherein said communication device would often have to be retrieved first from the place where it was stored.

If the claimed communication device is removed again from the connection interface, which action would be detected by the sensor, the system switches into a correction mode, for example. In this context, specific additional functionality similar to that of the setup mode can be activated on the communication device. In this way, it is possible to perform corrections on the live manufacturing and then simply reconnect the communication device afterwards, without any additional expenditure in terms of devices or time. The system can then switch over to manufacturing mode again.

The detection of the device connection by the sensor can also be utilized e.g. for checking whether all of the communication devices available on the system have actually been reconnected to the intended positions at the end of a shift, for example.

In an advantageous configuration, the communication device features an interface cable and the connection interface includes a cable connection interface for this interface cable. In comparison with the complete freedom of movement allowed when the communication device is not connected, this allows the operator limited but nonetheless possible mobility, within the limits of the interface cable, when operating and monitoring the system even while the communication device is connected and the system is e.g. in the normal mode. The sensor interacts with the communication device via the interface cable in this case. Of course, the interface cable can also be detachable from the communication device.

The connection interface advantageously includes a storage location in which the communication device can be placed. As a result, there is a defined location at the system where the communication device can be stored for as long as it is connected. This avoids the need to place the communication device on an additional table or on the-ground, and the precise position where it can be found is known. In this case, the sensor detects whether the communication device is inserted in the storage location and is therefore attached to the system.

Furthermore, it is advantageous if the communication device is fixed in the storage location in a lockable manner. When it is in the connected state, for example, it cannot then be stolen or removed by unauthorized personnel, which would result in the system switching from the manufacturing mode into the setup mode or would allow the user to carry out settings or changes to the manufacturing processes by changing the functionality of the communication device. Any removal of the communication device is e.g. only possible using a key which is managed by the supervisor.

If the sensor is a switch which interacts with the communication device or its interface cable, it can be implemented in a manner with is particularly easy, interference -proof and inexpensive.

In a particular embodiment, the apparatus features a data connection interface for wire-based data interchange between system and communication device. This can be integrated in the interface cable or the storage location. In addition, the apparatus includes a changeover unit for changing over between wireless and wire-based data interchange. According to the invention, the changeover of the data interchange can take place in such a way that the process interfacing is not interrupted. The data connection interface can also include an integrated field bus coupling or even additional lines for safety -relevant functions, for example.

In general, wireless data interchange is always more interference-prone or unreliable than wire-based data interchange. Furthermore, radio mode normally requires greater energy expenditure, which must be provided by the communication device, and e.g. in the above mentioned normal mode of the system the wireless data interchange is not usually required since the communication device is connected in this case. The changeover to wire-based communication therefore results in communication which is more reliable and less interference-prone and e.g. causes less EMC burden on the system from radio waves. The load on the radio network is also reduced.

The apparatus is particularly advantageous if the sensor interacts with the changeover unit in such a way that an automatic changeover to wire-based data interchange takes place when the communication device is connected to the connection interface. This ensures, for example, that a changeover to the less interference-prone wire-based data interchange always takes place when the communication device is connected. In addition, the operator cannot forget e.g. to change over the type of data interchange manually.

In order to run the freely moveable wirelessly functioning communication device, it must be equipped with a source of electrical energy. An advantageous development of the invention therefore makes provision for the connection interface in the apparatus to include a power supply for the communication device. This can again be integrated e.g. in the interface cable or the storage location. As a result, the energy reserve in the communication device is spared in the connected state, or can even be recharged if it is an accumulator. This also ensures that, in the connected state, the communication device has sufficient energy e.g. to run lighting at maximum brightness on the communication device.

BRIEF DESCRIPTION OF THE DRAWINGS

For a further description of the invention, reference is made to the exemplary embodiments in the drawings in which, by means of a block diagram in each case, FIG. 2 shows the industrial system from FIG. 1 with the communication device in the connected state in the context of wire-based communication.

DETAILED DESCRIPTION OF INVENTION

Figure 1:
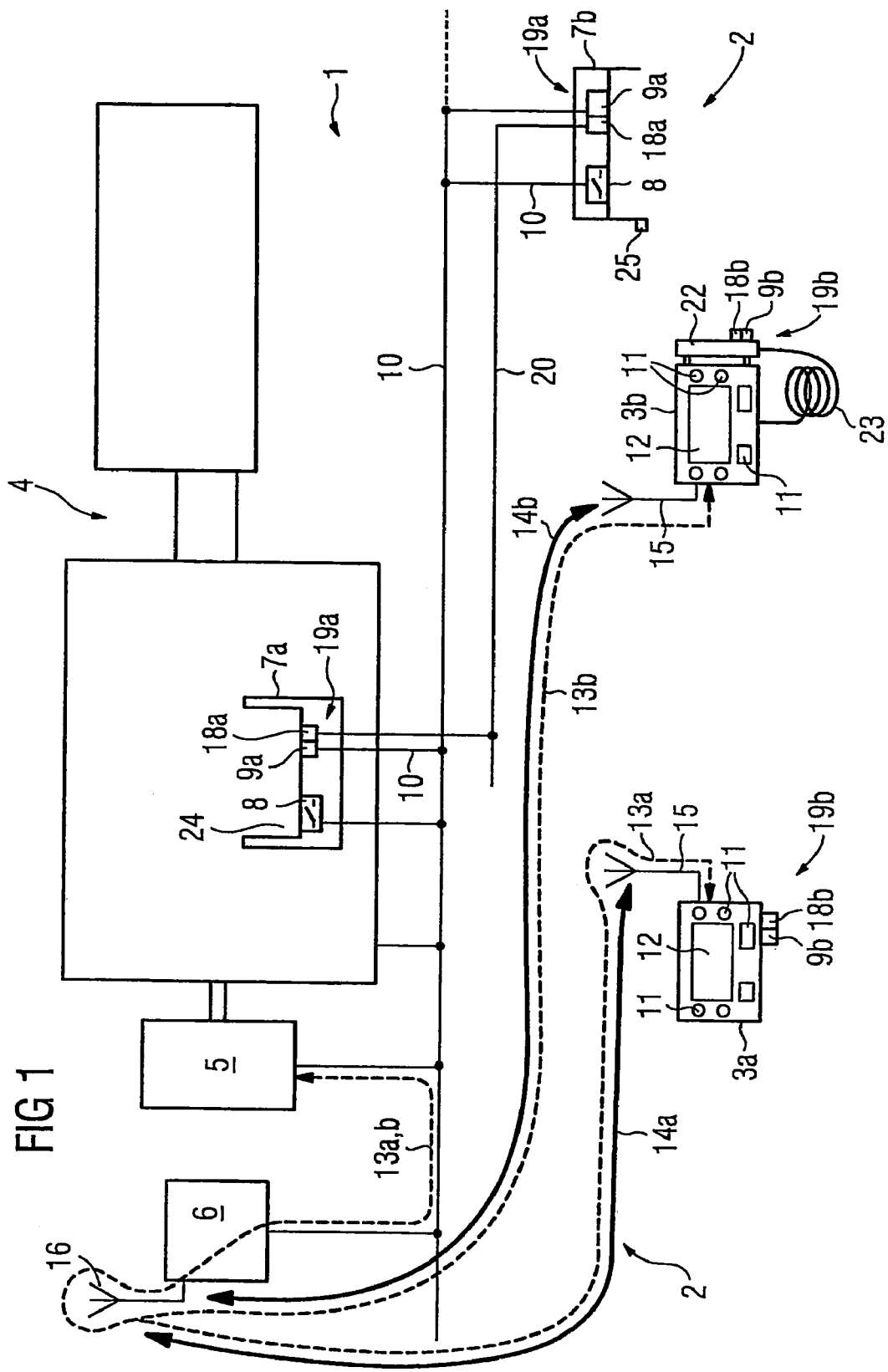
FIG. 1 shows a freely moveable wirelessly functioning communication device in an industrial system in the unconnected state in the context of wireless data interchange with the system.

FIG. 1 shows an automation system 1 including a permanently installed system part 2 and two mobile communication devices 3a,b. The system part 2 comprises a manufacturing machine 4, which is simply named machine 4 in the following, a control unit 5 which controls the machine 4, and a radio station 6. The machine 4 is very large and cannot be surveyed from a single standpoint by an operator. A first connection interface 7a is permanently attached, e.g. screwed on, at one end of the machine 4. Near to the other end of the machine 4, a second connection interface 7b is attached e.g. to the wall of the manufacturing hall (not shown) in which the machine 4 is located. Since they are located in the manufacturing area of the system 1, the connection interfaces 7a,b are designed to be suitable for industrial use, i.e. water-protected, dust-protected and mechanically robust.

The connection interface 7a has a storage receptacle 24 which is used for holding the communication device 3a, though this has been removed from the connection interface 7a or storage receptacle 24 in FIG. 1. The connection interface 7a includes a sensor 8 in the form of a switch and a data connection interface 9a which, together with contacts 18a for the power supply (usually 24 volts), is integrated in a connection interface socket 19a.

The connection interface 7b likewise comprises a sensor 8 and a connection interface socket 19a including data connection interface 9a and contacts 18a for a supply voltage. The connection interface 7b is not designed as a storage receptacle, however, but as a connection interface port or so-called access point which is suitable for use in industry. A lock 25 which can be closed using a key (not shown) is also attached to the connection interface 7b.

All components of the system part 2 are connected together via a field bus 10 for the purpose of data interchange. The data connection interface 9a therefore provides a field bus coupling. Further additional interface cables (not shown), e.g. having safety-related functionality, can be integrated in the connection interface socket 19a. The contacts 18a are connected to the voltage network 20 of the automation system 1.

The communication devices 3a,b when used as input devices have push keys 11 by means of which the machine 4 can be operated via the control unit 5, and when used as an output device have a display 12 on which current machine parameters of the machine 4 are displayed and by means of which the machine 4 can therefore be monitored. Also attached to each of the communication devices 3a,b is a connection interface terminal 19b which corresponds to the connection interface socket 19a and includes the reciprocal contacts corresponding to the connection interface socket 19a, e.g. a data connection interface 9b and contacts 18b for supply voltages. The power supply for the communication devices 3a,b in FIG. 1 is provided by means of accumulators which are contained therein but are not shown.

The communication devices 3a,b differ by virtue of the connection interface terminals 19b which are attached thereto. In the case of communication device 3a, the connection interface terminal is permanently attached to the casing, whereas it is attached to a removable contact unit 22 in the case of communication device 3b. The contact unit 22 in turn is permanently connected to the communication device 3b via a flexible service line 23.

The communication between a communication device 3a,b and the control unit 5 takes place in each case along communication paths which are shown by the arrows 13a,b. The communication paths 13a,b initially travel between communication device 3a,b and radio station 6 over radio sections 14a,b which are formed between the antennas 15,16 on the communication devices 3a,b and the radio station 6. At the radio station 6, the communication data is converted from the antenna 16 to the field bus 10 and transmitted via the field bus 10 to the control unit 5.

The sensors 8 are connected to the control unit 5 via the field bus 10. The sensors 8, which are open because the communication devices 3a,b have been removed in FIG. 1, enable the control unit 5 to detect that the communication devices 3a,b have been removed, i.e. are not connected. In this running state, there is no connection between the connection interface sockets 19a and the connection interface terminals 19b on the communication devices 3a,b.

The utilization of the information from the sensors 8, i.e. that the communication devices 3a,b have been removed, is freely programmable in the control unit 5. In FIG. 1, the control unit 5 is programmed such that the machine is in setup mode as a result of the communication devices 3a,b being removed. A different functionality may also be desirable for other systems, however.

In the setup mode, as a result of the process interfacing to the machine 4 via radio, an operator handling the communication device 3a,b can freely select an optimal position to occupy at the system part 2 or change said position without restriction, and operate and monitor the machine 4 from there.

In FIG. 2, the communication devices 3a,b are inserted in the connection interfaces 7a,b. As a result of this, the sensors 8 are pressed down and therefore in a closed position. By means of the sensors 8, the control unit 5 detects that the communication devices 3a,b are inserted and notifies the communication devices 3a,b of this. This information can be used by the control unit 5 to now run the machine 4 in the normal manufacturing mode, for example. The communication devices 3a,b can also e.g. change their functionality as a result of this, i.e. specific keys 11 can be rendered inactive or other machine parameters can be indicated on the display 12, for example.

In FIG. 2, both communication devices 3a,b are connected to (e.g. engaged in) their respective connection interfaces 7a,b. In the case of communication device 3b, the contact unit 22 is separated from the actual device body and plugged into the connection interface 7b. While the communication device 3a is now connected in a fixed location, the communication device 3b is still mobile within the reach of its service line 23 although it is likewise connected. Therefore an operator of this communication device 3b still has room to move and can moreover, within certain limits, choose his or her position in relation to the machine 4. The contact unit 22 is locked into the connection interface 7b in FIG. 2, since the lock 25 has been swung forwards and locked, using the key, against swinging back again. It is therefore impossible to remove contact unit 22 from the connection interface 7b again without a key.

The connection interface sockets 19a are connected to the connection interface terminals 19b, thereby connecting the data connection interfaces 9a and 9b, the contacts 18a and 18b for the power supply and any other lines which are included. The communication devices 3a,b are therefore supplied with energy from the system part 2 via the voltage network 20, and no longer require energy from their integrated accumulators. These are recharged via the power supply, such that sufficient energy is stored for the next radio mode as per FIG. 1. In this way, it is also possible e.g. to increase the brightness of the back-lit display 12 to maximal luminosity, since sufficient energy is available for this purpose from the power supply of the system part 2. In the accumulator mode according to FIG. 1, the brightness is usually reduced in order to save energy.

Since the control unit 5 is informed by the depressed sensors 8 that the communication devices 3*a,b* are connected, the data interchange between communication device 3*a,b* and control unit 5 is changed over from wireless to wire-based, and the antennas 15,16 are therefore not in use. The data traffic travels along the communication path 13*a,b* which now travels from the communication device 3*a,b* via the data connection interfaces 9*a,b* and the field bus 10.

In order to change over between wire-based and wireless data interchange, a changeover unit (not shown) is integrated in the control unit 5, for example. This can be a program section of the control program, but it can also be an actual switch. In the present case, the changeover unit is linked to the sensors 8 in such a way that the changeover takes place automatically as soon as the switch state of the sensors 8 changes.

The operation of the overall system 1 therefore continues to be coordinated using the same communication devices 3*a,b* as in FIG. 1. The changeover from cable-based back to radio mode can take place at any time during the running of the system 1, by removing the communication devices 3*a,b* from the connection interfaces 7*a,b* again.

Of course, it is also possible to remove only one communication device 3*a* or 3*b* from the corresponding connection interface 7*a,b* and to operate only this communication device wirelessly while the other communication device 3*b,a* continues to communicate in a wire-based manner with the control unit 5. The utilization in the control unit 5 and in the communication devices 3*a,b* of the information from the corresponding sensors 8 in such a case must of course be adapted to the needs of the production system 1 concerned.

The invention claimed is:

1. An apparatus for communicating with a system, comprising:
   a mobile communication device for wirelessly exchanging data with the system;
   a stationary connection interface for accommodating and connecting the mobile communication device to the system;
   a sensor for detecting whether the mobile communication device is connected to the stationary connection interface; and
   a system control unit, wherein the system control unit is connected to the sensor for analyzing the detecting by the sensor, wherein a functionality of the mobile communication device is changed when the mobile communication device is connected to the stationary connection interface such that the functionality of the mobile communication device chances from a setup mode or a correction mode into a normal mode deactivating the setup-specific functionality, the setup mode or correction mode being used for wirelessly configuring or adjusting the system.

2. The apparatus as claimed in claim 1, wherein the system is an operating and monitoring system of an automation system used in industrial manufacturing.

3. The apparatus as claimed in claim 1, wherein the mobile communication device includes an interface cable, and the stationary connection interface includes a cable connection interface for accommodating the interface cable.

4. The apparatus as claimed in claim 1, wherein the connection interface includes a storage location for accommodating the mobile communication device.

5. The apparatus as claimed in claim 1, wherein the mobile communication device is fixed to the stationary connection interface using a detachable lock.

6. The apparatus as claimed in claim 1, wherein the sensor is a switch configured to interact with the mobile communication device.

7. The apparatus as claimed in claim 3, wherein the sensor is a switch configured to interact with the interface cable.

8. The apparatus as claimed in claim 1, further comprising:
   a data connection interface for establishing a wire-based data exchange between the system and the mobile communication device; and
   a selector unit for changing over between wireless and wire-based data exchange.

9. The apparatus as claimed in claim 8, wherein the sensor is configured to interact with the selector unit such that the changing over to wire-based data exchange is executed if the mobile communication device is connected to the stationary connection interface.

10. The apparatus as claimed in claim 1, wherein the stationary connection interface includes a power supply for supplying the mobile communication device when connected to the connection interface.

* * * * *